United States Patent
Hutton et al.

(10) Patent No.: US 7,475,193 B2
(45) Date of Patent: Jan. 6, 2009

(54) SEPARATE DATA AND COHERENCY CACHE DIRECTORIES IN A SHARED CACHE IN A MULTIPROCESSOR SYSTEM

(75) Inventors: David S. Hutton, Poughkeepsie, NY (US); Kathryn M. Jackson, Poughkeepsie, NY (US); Keith N. Langston, Woodstock, NY (US); Pak-kin Mak, Poughkeepsie, NY (US); Bruce Wagar, Tempe, AZ (US)

(73) Assignee: International Business Machines Corporation, Armonk, NY (US)

(*) Notice: Subject to any disclaimer, the term of this patent is extended or adjusted under 35 U.S.C. 154(b) by 68 days.

(21) Appl. No.: 11/334,280

(22) Filed: Jan. 18, 2006

(65) Prior Publication Data

US 2007/0168619 A1   Jul. 19, 2007

(51) Int. Cl.
*G06F 12/00* (2006.01)
(52) U.S. Cl. ........................ 711/130; 711/122
(58) Field of Classification Search ................. 711/130, 711/141, 122
See application file for complete search history.

(56) References Cited

U.S. PATENT DOCUMENTS

| 6,295,598 B1* | 9/2001 | Bertoni et al. ................ 712/28 |
| 6,560,681 B1* | 5/2003 | Wilson et al. ................ 711/144 |
| 6,625,694 B2* | 9/2003 | Masri et al. ................. 711/133 |
| 2001/0032299 A1* | 10/2001 | Teramoto .................... 711/141 |
| 2002/0010836 A1* | 1/2002 | Barroso et al. .............. 711/122 |
| 2004/0059876 A1* | 3/2004 | Nanda et al. ................ 711/141 |

* cited by examiner

*Primary Examiner*—Sheng-Jen Tsai
(74) *Attorney, Agent, or Firm*—Lynn L. Augspurger; Graham S. Jones

(57) ABSTRACT

A dual system shared cache directory structure for a cache memory performs the role of an inclusive shared system cache, i.e., data, and system control, i.e., coherency. The system includes two separate system cache directories in the shared system cache. The two separate cache directories are substantially equal in size and collectively large enough to contain all of the processor cache directory entries, but with only one of these separate cache directories hosting system-cache data to back the most recent fraction of data accessed by the processors. The other cache directory retains only addresses, including addresses of lines LRUed out from the first cache directory and the identity of the processor using the data. Thus by this expedient, only the directory known to be backed by system cached data will be evaluated for system cache memory data.

19 Claims, 2 Drawing Sheets

SEPARATE DATA AND COHERENCY CACHE DIRECTORIES IN A SHARED CACHE IN A MULTIPROCESSOR SYSTEM

BACKGROUND OF THE INVENTION

The method and system relate to assuring that data stored in a large shared L2 cache memory in a multi-processor environment and the data of the main memory are either identical or are controlled so that stale and current data are not confused with each other.

In a shared memory multiprocessor of the prior art, with a separate L1 cache memory for each processor (hereinafter referred to as an L1 cache), it is possible to have many copies of any one instruction operand: one copy in the main memory and one copy in each individual L1 cache memory. When one copy of an operand is changed, the other copies of the operand must be changed also, i.e., to provide cache coherence. Cache coherence is the discipline that ensures that changes in the values of shared operands are propagated throughout the system in a timely fashion.

There are three distinct levels of system behavior to be considered with respect to cache coherence:

In level 1, every write operation appears to occur instantaneously.

In level 2, all processes see exactly the same sequence of changes of values for each separate operand.

In level 3, different processes may see an operand assume different sequences of values. (This is considered noncoherent behavior.)

In both level 2 behavior (where all processes see exactly the same sequence of changes of values for each separate operand) and in level 3 behavior (where different processes may see an operand assume different sequences of values, e.g., non coherent behavior), a program can observe stale data.

In a large shared-memory multiprocessor, providing a system level cache memory (hereinafter referred to as an L2 cache) of the recently accessed contents of memory, along with an efficient means to handle system-wide cache coherency, can theoretically be accomplished with a single system cache directory away by requiring the contents of the respective processor level L1 cache memories to be a subset of the L2 system cache memory. Unfortunately, when the combined size of the processor L1 cache memories is sufficiently large, there is the problem that an inclusive L2 system cache approach can become impractical because the resulting size of the L2 system cache memory required to work effectively becomes too big.

While one possible solution to the above problem is to maintain a single system directory only partially backed by cache data, this proves difficult in practice. This is because the logic must now evaluate which entries have data and which do not when determining a system cache data hit.

SUMMARY OF THE INVENTION

In accordance with this invention, for a shared, inclusive L2 system cache, a solution is provided to the problems inherent in maintaining a single L2 system cache directory only partially backed by cache data, where the logic must evaluate which entries have data and which entries do not have data when determining a system cache data hit, the present invention provides a system with two complementary L2 system cache directories. That is, the two complementary L2 system cache directories are not associated with a particular processor or processors, but are L2 system cache directories accessible to all of the processors in the system.

These two complementary L2 system cache directories are substantially equal in size and collectively large enough to contain all of the processor L1 cache directory entries, but with only one of these two complementary L2 system cache directories hosting system-cache data to back the most recent fraction of data accessed by the processors. By this expedient, only the directory known to be backed by system cached data will be evaluated for system cache data hits.

More specifically, the method and system of this invention uses two non-overlapping L2 system cache directories. These are substantially equally sized and are referred to herein as an L2 superset cache directory and an L2 subset cache directory. As used herein, the following terms have the following meanings:

The L2 "Superset Cache Directory" is an L2 system cache directory backed by system cache data, which is the superset of data available to the processors or L2 subset cache directories. That is, the L2 superset directory manages both coherency and data.

The L2 "Subset Cache Directory" is an L2 system cache directory which is not backed by the system cache memory. That is, only the processors or the L2 subset cache directories have data not available in the L2 system cache directory. In this way the L2 subset cache directory manages coherency only.

Together the two complementary L2 system cache directories are sufficient in size to contain the entries of all underlying processor L1 cache directories, together with the system cache memory.

The total cache memory is as large as practical given such factors as fast access times and reasonable chip area, and the total cache memory maps the most recent fraction of the system cache directory entries into the superset cache directory.

The two L2 cache directories collectively behave both as a data cache memory and a system wide coherency cache memory. As a data cache memory, the structure is used for recent memory data needed by the processors. As a system wide coherency cache memory, the structure is used as a system wide coherency controller. The coherency controller maintains a record of which processors in the multi-processor have copies of which portions of the main memory and the state of operation thereof.

The system and method described herein includes a dual system L2 cache directory structure that performs the role of a shared, inclusive L2 system cache, i.e., data, and of system control, i.e., coherency, when the size of the system cache memory is insufficient to contain the contents of all of the underlying cache memories. The system and method of this invention avoids the complexity of a single structure solution, with its extra Most Recently Used/Least Recently Used (MRU)/(LRU) complexity, area, and data backed hit detection. It also avoids the extra cache level overhead on the underlying cache memories to manage coherency, and even the absence of a system data cache memory. When an LRU entry is removed from a cache memory entry it is referred to hereinafter as being LRUed and process of removal thereof is referred to as LRUing. An entry that has been removed is referred as being identified as LRU-out.

An advantage of using two symmetric L2 cache directories is that their entries are paired one-to-one, such that once an entry is identified for LRU-out of the superset directory (i.e. removal therefrom), the respective subset entry to receive this LRU-out entry (i.e. removed entry) is immediately identified, without requiring any special logic of its own.

Furthermore, a processor requesting a system lookup requires a scan of the L2 superset directory only, rather than a lookup in a combined directory, which would require additional logic to distinguish between data-backed and data-less system cache entries.

As far as the design is concerned, the L2 superset directory and system cache memory are collectively what would be considered a traditional system cache memory. By adding the L2 subset directory to the mix, entries would normally be LRUed out of the L2 superset directory (i.e. removed therefrom), as well as the respective L1 caches in the processors would now be placed in the L2 subset directory and left to persist in the processors. This improves overall performance.

THE DRAWINGS

Various aspects of our invention are illustrated in the drawings appended hereto.

DETAILED DESCRIPTION

The method and system of the present invention uses two complementary L2 cache directories, one L2 superset cache directory for data and the other L2 subset cache directory for coherency. These two L2 cache directories are substantially equal in size and collectively large enough to contain all of the processor L1 cache directory entries, but with only one of these L2 cache directories hosting system-cache data to back the most recent fraction of data accessed by the processors associated therewith. By this expedient, only the cache directory known to be backed by system cached data will be evaluated for system cache data hits.

The system and method of the present invention is a dual system L2 cache directory structure that performs the role of system cache, i.e., data, and system control, i.e., coherency, when the size of the system L2 cache directory is insufficient to contain the contents of all of the underlying L1 caches.

Figure 1:
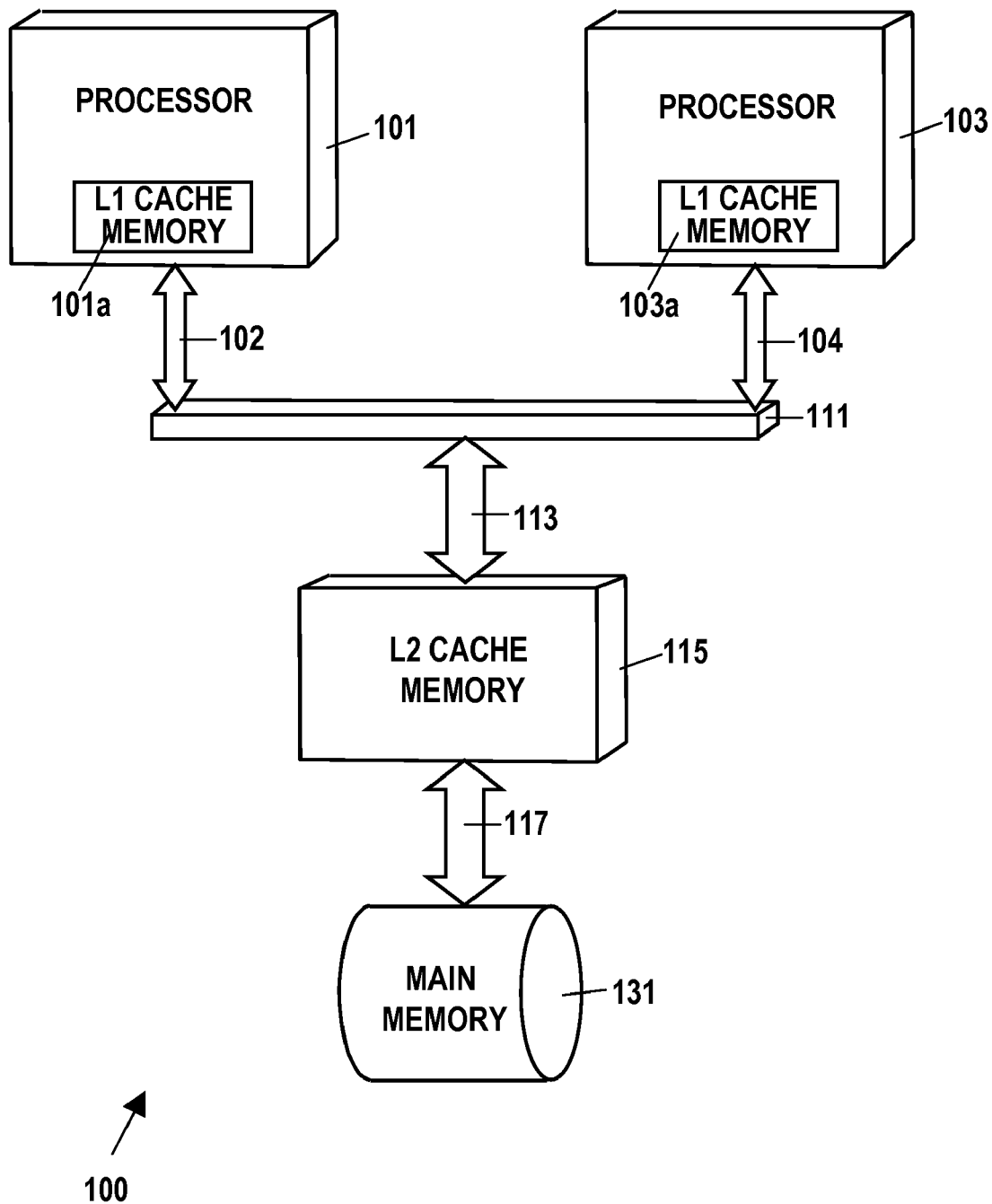
FIG. 1 is a high level block diagram representation of a Prior Art multi-processor system with each of two processors having an individual L1 cache memory, and with an L2 cache memory associated with both of the two processors.

FIG. 1 illustrates a prior art system 100 with a set of processors 101, 103. Each of the processors 101, 103 has its own conventional associated L1 cache memories 101A, 103A. The L1 cache memories 101A, 103A contain copies of the recent instructions and data of recent work performed on the associated processor 101 or 103. There is also a conventional L2 cache memory 115. The individual, associated L1 caches, 101A, 103A, are connected through bi-directional data busses 102 and 104, an arbiter 111 which, as is conventional, queues/manages transmissions form the processors 101, 103 and the L2 system cache, and bi-directional data bus 113 to the shared system L2 cache memory 115, interposed between the processors 101, 103, and through bi-directional data bus 117 to the main memory 131.

Figure 2:
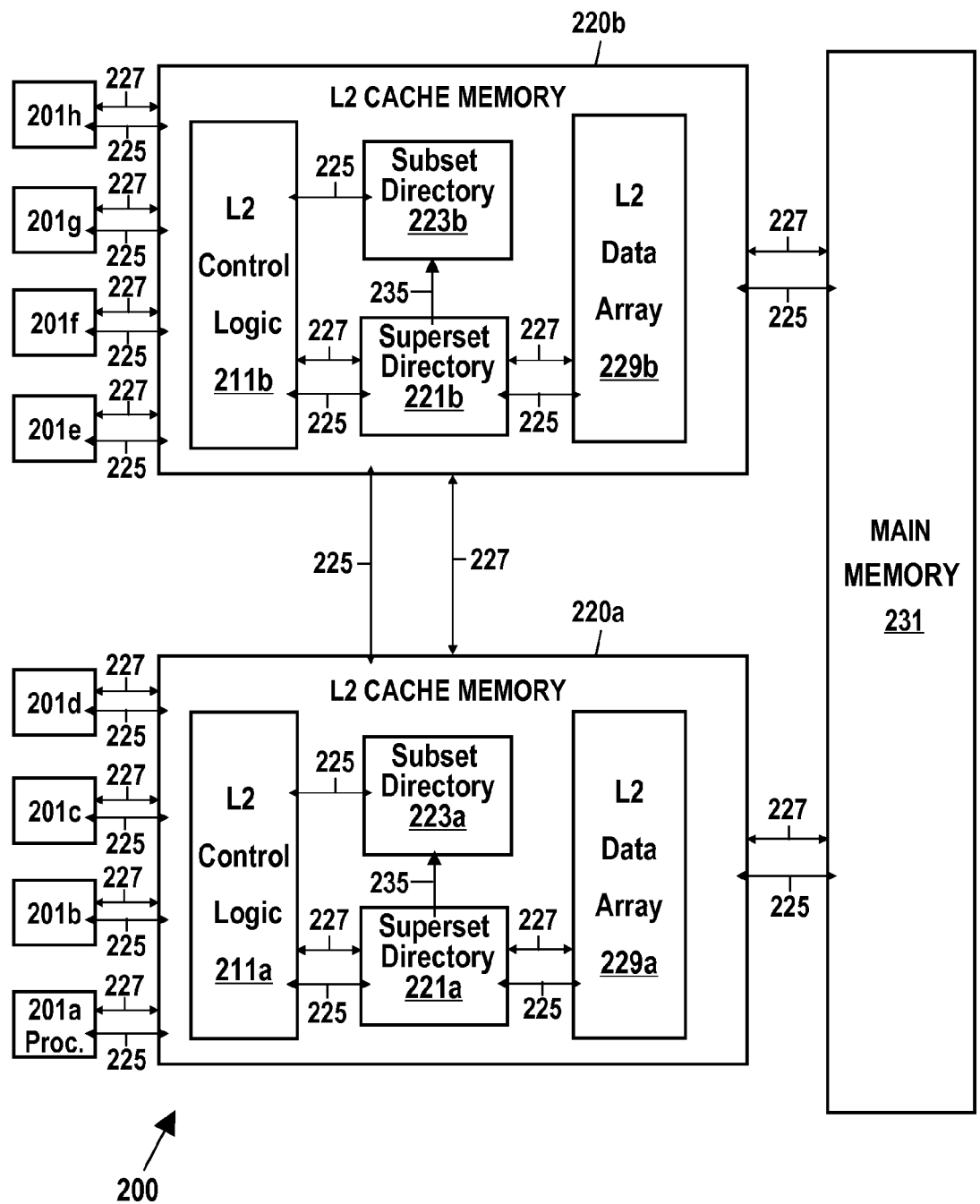
FIG. 2 illustrates a high level representation of a multi-processor system in accordance with this invention including an L2 system cache memory with a dual L2 system superset cache directory and subset cache directory structure that performs the role of system cache, i.e., data, and system control, i.e., coherency.

FIG. 2 shows a multi-processor system 200 in accordance with this invention, including eight processors 201a-201h (including a first group 201a-201d and a second group 201e-201h) and two L2 cache memories 220a and 220b. The cache memory 220a includes an L2 control logic block 211a, an L2 superset cache directory 221a, an L2 subset cache directory 223a, and an L2 data array 229a. The L2 cache memory 220b includes an L2 control logic block 211b, an L2 superset cache directory 221b and an L2 subset cache directory 223b and an L2 data array 229b. The four directories 221a, 221b, 223a, and 223b collectively manage cache coherency. The L2 superset cache directory 221a and the L2 superset cache directory 221b are also backed by data, and can readily supply it to any requesting processor (this is what is recognized as a "traditional data/coherency cache").

The L2 subset cache directory 223a and the L2 subset cache directory 223b provide a low-overhead means of allowing processors 201a through 201h to retain a line LRUed out of the traditional/superset cache directories 221a and 221b. The subset cache directory 223a and the subset cache directory 223b are not tied to the L2 data array 229a and 229b respectively Each of the subset cache directories 223a and 223b is not actually a data cache but is an L2 cache directory with memory addresses and processor identifiers only. As data is LRUed out of a superset cache directory 221a or a superset cache directory 221b, the address thereof is still retained in the corresponding subset cache directory 223a or the corresponding subset cache directory 223b.

Without the subset cache directory 223a or subset cache directory 223b, upon LRUing out of the superset cache directory 221a and the superset cache directory 221b, a line is "required" to be invalidated out of every processor 201a through 201h; i.e., if the L2 cache directory can not manage the coherency of a line, then "no" processor 201a through 201h may possess the line. However now, the processors 201a through 201h can retain these lines a while longer, as the L2 subset cache directory 223a and the L2 subset cache directory 223b will continue to manage lines that have been LRUed out of the L2 superset cache directory 221a and the superset cache directory 221b.

The processors 201a through 201h do not communicate directly with the main memory 231, but rather they communicate through the respective L2 control logic blocks 211a and 211b, the L2 superset cache directory 221a, the L2 superset cache directory 221b, the L2 Data Array 229a and the L2 Data Array 229b.

There is no bidirectional data bus 227 connected to either the L2 subset cache directory 223a or the L2 subset cache directory 223b. Only a set of bidirectional control busses 225 do an address lookup, and only the bidirectional control busses 225 have the control means to invalidate lines out of the processors 201a through 201h.

FIG. 2 shows separate bidirectional data busses 227 and bidirectional control busses 225. The L2 cache memories 220a and 220b which contain the L2 control logic blocks 211a and 211b, the L2 superset cache directories 221a and 221b, the L2 subset cache directories 223a and 223b, and the L2 data arrays 229a and 229b are characterized as an "L2 Node". Note that a unidirectional control bus 235 connects from the L2 superset cache directory 221a and the L2 superset cache directory 221b to the respective L2 subset cache directory 223a and the respective L2 subset cache directory 223b. This unidirectional control bus 235 copies the directory entry being LRUed out of the L2 superset cache directory 221a and the L2 superset cache directory 221b into the respective L2 subset cache directory 223a or the respective L2 subset cache directory 223b. In one embodiment, the L2 superset cache directory 221a or the L2 superset cache directory 221b signals the respective control logic 211a and 211b that it is LRUing a line, which the control logic 211a and 211b will then write into the respective L2 subset cache directory 223a or 223b. As is conventional, four pairs of bidirectional data busses 227 and bidirectional control busses 225 connect the first group of processors 201a-201d to the L2 cache memory 220a. Four other pairs of bidirectional data busses 227 and the bidirectional control busses 225 connect the second group of processors 201e-201h to the cache memory 220b. A bidirectional data bus 227 and a bidirectional control bus 225 connect the cache memory 220a to the main memory 231. Another bidirectional data bus 227 and another bidirectional control bus 225 connect the cache memory 220b to the main memory 231. A bidirectional data bus 227 and a bidirectional control bus 225 interconnect the L2 cache memory 220a to the L2 cache memory 220b. A bidirectional control bus 225 connects each L2 subset cache directory 223a/223b to the corresponding L2 control logic block 211a/211b.

In order to work efficiently there is provided a system control method or system in place to control resource access, ensure cache coherency, etc. This system, structure, or method can be single level or multi-level, and while it is illustrated herein as a single level system, structure, or method, the methods, systems, and structures illustrated herein may be extended to multi-structure systems, methods, and structures.

The system is useful for providing cache coherence to a multiprocessor system having a dual system directory structure having two system cache directories performing the role of system cache for data, and system control for coherency. This is done by writing an entry to a superset cache directory 221a/221b, and writing an address and a calling processor identifier for the entry to a subset cache directory 223a/223b, LRUing the entry out of the superset cache directory 221a/221b and retaining the address and calling processor identifier for the entry in the subset cache directory 223a/223b. In this way system-cache data is hosted in the L2 data array 229a or 229b to back the most recent data accessed by the processors 201a-201h. This enables evaluating the L2 subset cache directory 223a/223b for system cache data hits, as well as maintaining a record in the L2 subset cache directory 223a/223b of which processors 201a-201h have cached which portions of memory 231 they are actually using.

There are two parts of the system, structure, and method described herein:

A System Cache directory. The system cache directory also referred to herein as an L2 superset cache directory 221a and an L2 superset cache directory 221b, is a cache directory of all the recent instructions and data of the processors 201a-201h under control of the system. It performs two roles:

a.(i). It resupplies data to a processor L1 cache memory when such data ages out or is otherwise removed from the processor L1 cache and coherency is provided.

(ii). Provides data to other processors, for example, by other system cache memories, when such data is to be used by more then one processor and coherency is provided.

b. System cache directory coherency is provided by the L2 subset cache directory 223a and L2 subset cache directory 223b, also referred to herein as a coherency cache. As a general rule, memory can not be accessed every time it is needed or changes. This is because the access time is too large relative to the speed of the processors 201a-201h. Consequently, the function of maintaining a single coherent view of memory 231 to the processors 201a-201h via their respective processor L1 caches falls on the system control method, system and structure described herein. By maintaining a record of which processors 201a-201h have cached which portions of the memory 231 they are actually using, the system control method, system, and structure can take appropriate action when another one of the processors 201a-201h needs to access the same parts of the memory 231.

If the total system L2 cache directory 221a, 221b can be built sufficiently large enough then it is not a problem to manage the system L2 superset cache directories 221a and 221b, such as by requiring all processor cache contents to be part of the L2 system superset cache directories 221a, 221b contents (the "subset rule"). But, if such an L2 cache is too large for practical use, it becomes necessary to redesign the system, or to have no system cache, or to have the subset rule, above, limit a significant portion of the processor L1 caches available to the associated processors 201a-201h, or to have two separate L2 system cache directories, one to manage the cache and one to manage the cache coherency, with the associate complexity to make it all work.

According to the method, system, and structure described herein, there are provided comprising an L2 superset cache directory 221a and an L2 superset cache directory 221b (where all L1 processor cache memory contents are part of the L2 system cache memory contents) in conjunction with an L2 subset system cache directory 223a or 223b not backed by system cache, that is, where only the processors 201a-201h or the L2 subset caches have data not available in the system cache. In this way the subset cache directory 223a or 223b manages coherency only, both the subset system cache directory 223a or 223b and the respective superset cache directory 221a or 221b being, in total, large enough to handle both system cache coherency, together with a system cache of practical size, where only the superset directory 221a or 221b (hosting the most recently accessed entries) has corresponding data in the system cache.

For purposes of illustration, consider a system cache, e.g., cache 115 of FIG. 1, or L2 superset cache directories 221a/221b and L2 subset cache directories 223a and 223b of FIG. 2 of size $N=C*A$ entries, where as follows:

a. "C" represents the number of congruence classes, where each of the congruence classes represents a set of addresses of memory corresponding to one of C possible values.

b. "A" represents the associativity of each congruence class, that is, the number of cache entries that can share the same address mapping used to select the congruence class.

Typical computer cache designs, e.g., cache 115 in FIG. 1, have such a structure, along with a corresponding L2 cache directory with a similar $N=C*A$ structure, each directory entry representing the corresponding cache entry and containing such information as the memory address of the cache entry, the last processor to access the data, and whether the data has been changed with respect to the main memory contents. Lastly, some form of LRU (Least Recently Used) logic is present for each congruence class to manage the entries within that congruence class from the LRU (Least Recently Used) to MRU (Most Recently Used).

In this context, the most prevalent prior art uses of LRU logic have been as follows:

Update. When an address is looked up and found in a cache directory, typically it is made MRU (Most Recently Used) entry, changing the location of all those entries that stand in between it and the Most Recently Used position.

2. Install. When an address is not found in a cache directory, typically a place is cleared for it, this time choosing the LRU (Least Recently Used) entry, replacing it with the new entry, then making the new entry the MRU entry.

Returning to the system cache, if N entries are insufficient to provide efficiency, but, for example, 2*N entries are sufficient to provide efficient system cache coherency, then the system cache is kept to N entries, but the system directory is doubled to 2*N, as illustrated by L2 cache directories 221a/221b and 223a/223b in FIG. 2 where the existing directory is now called an L2 superset cache directory (data backed directory), and the newly added entries is the L2 "subset" (data less, coherency cache directory).

This pair of cache directories, (i.e. the L2 subset cache and the superset cache directories), perform both updating and installing. When looking up a particular address, both directories are accessed in parallel. In accordance with this invention, the following changes are made:

First, if a new L2 superset cache directory entry is installed for modification and a hit for the same entry is detected in the L2 subset cache directory, the L2 subset cache directory entry will be invalidated, as well as being invalidated out of the processors 201a-201h identified by the L2 subset cache directory as hosting the entry. Additionally a) if the new entry is shared and the L2 subset cache directory entry is shared, the state of the entry is merged into the L2 superset cache directory entry while leaving the entries untouched in the processors 201a-201h identified by the L2 subset cache directory as hosting the entry.

b) if the new entry is to be modified and the L2 subset cache directory is shared, the entry/data is invalidated out of all processors 201a-201h identified as having the entry by the L2 subset cache directory.

c) if the L2 subset cache directory entry is modified, appropriate coherency management is performed as required by the specific implementation.

If a new superset directory install requires an LRU-out of a given see entry of the L2 superset cache directories (and consequently the L2 system cache), the given entry is still removed from the L2 system cache, but the L2 superset cache directory given entry is not invalidated and is instead migrated into an entry in the L2 subset cache directory.

a) if this L2 superset-to-subset cache directory migration requires an LRU-out of the L2 subset cache directory as well as all processors 201a-201h identified by the L2 subset cache directory as hosting the entry.

In the case of data invalidated out of the processors 201a-201h as a result of an L2 subset cache directory invalidation, whether either from a new superset directory that is installed, and a hit is detected for the same entry in the subset cache directory, or from a new superset directory install requires an LRU-out of the superset cache directory, appropriate action is taken, e.g., writing the entry back to main memory if it differs from the main memory copy.

In a preferred example of this invention, the L2 superset and subset cache directories are matched and no special logic is required to identify the targeted L2 subset cache directory receiving a migration from the L2 superset cache directory, that is, if an entry LRU's out of an L2 superset cache directory [C][A], it migrates into an L2 subset cache directory [C][A]. For this reason only the L2 superset cache directory needs or has LRU/MRU logic.

The system and method described herein is a dual system directory structure that performs the role of an L2 system cache directory, i.e., data, and system control, i.e., coherency, when the size of the L2 system cache directory is insufficient to contain the contents of all of the underlying caches. That is, it is a separate data/coherency cache.

While the invention has been described with respect to certain preferred embodiments and examples, it is not intended to limit the scope of the invention thereby, but solely by the claims appended hereto.

We claim:

1. A multiprocessor system comprising:
a plurality of processors; a main memory; and at least one shared cache memory;
said shared cache memory including shared control logic;
a dual system directory structure having two system shared cache directories including a shared superset cache directory and a shared subset cache directory for performing the role of L2 system cache directories for data, and system control for coherency; and a shared data array;
bidirectional control and data busses interconnecting said processors with said shared cache memory;
bidirectional control and data busses interconnecting said shared superset cache directory with said shared control logic and said shared data array;
a unidirectional control bus connecting from said shared superset cache directory to said shared subset cache directory and no data bus connecting to said shared subset cache directory;
a bidirectional control bus interconnecting said shared subset directory and said shared control logic;
bidirectional control and data busses interconnecting said shared superset cache directory and said main memory;
no data bus or control bus between said L2 subset cache directory and said shared data array or said main memory, and
in response to an entry being removed from said shared cache memory, said superset directory entry is not invalidated and is instead migrated into said shared subset cache directory.

2. The multiprocessor system of claim 1 wherein said shared superset cache directory and said shared subset cache directory are substantially equal in size and collectively large enough to contain all processor cache directory entries.

3. The multiprocessor system of claim 2 wherein system cache data most recently accessed by said processors is hosted in said shared data array.

4. The multiprocessor system of claim 3 wherein a said directory known to be backed by system cached data will be evaluated for system cache data hits.

5. The multiprocessor system of claim 2 wherein said subset cache directory hosting system cache coherency data maintains a record of which of said processors have cached which portions of said main memory they are actually using.

6. A method of providing cache coherence to a multiprocessor system including a plurality of processors and a main memory comprising:
providing a shared cache memory including shared control logic; a dual system directory structure having two shared system cache directories including an L2 superset cache directory and a shared subset cache directory for performing as a system cache for data, and system control for coherency and an L2 data array;
interconnecting said processors to said shared cache memory with bidirectional control busses and bidirectional data busses
interconnecting said L2 superset cache directory to said shared control logic and said shared data array with bidirectional control busses and bidirectional data busses;
interconnecting said shared superset cache directory to said shared subset cache directory with a unidirectional control bus from said shared superset cache directory to said shared subset cache directory;
providing a bidirectional control bus interconnecting said shared subset directory with said shared control logic;
providing a unidirectional control bus connecting from said shared superset cache directory to said shared subset cache directory and no data bus connecting to said shared subset cache directory;
writing an entry to said shared superset cache directory, and writing an address and a calling processor identifier for the entry to said shared subset cache directory, providing no data bus or control bus between said L2 subset cache directory and said shared data array or said main memory, LRUing said entry out of said superset cache directory and retaining said address and calling processor identifier for entry in said shared subset cache directory, and migrating said entry into said shared subset cache directory in response to removal of an entry from said shared cache memory, so that said superset directory entry is not invalidated.

7. The method of claim 6 wherein system cache data most recently accessed by said processors is hosted in said shared data array.

8. The method of claim 7 comprising evaluating said shared superset cache directory for system cache memory data hits.

9. The method of claim 6 comprising maintaining a record in said shared subset cache directory of which processors have cached which portions of memory actually being used thereby.

10. A method of providing cache coherence to a multiprocessor system including a plurality of processors and a main memory comprising:

providing a plurality of processors; a main memory; and at least one shared cache memory;

said shared cache memory including shared control logic; a dual system directory structure having two L2 cache directories including a shared superset cache directory and a shared subset cache directory for performing the role of shared system cache directories for data, and system control for coherency; and a shared data array;

interconnecting said processors with said shared cache memory with bidirectional control busses and bidirectional data busses;

interconnecting said shared superset cache directory to said shared control logic and said shared data away with bidirectional control and data busses;

connecting from said shared superset cache directory to said shared subset cache directory and no data bus connecting to said shared subset cache directory with a unidirectional control bus;

interconnecting said shared subset directory and said shared control logic with a bidirectional control bus;

interconnecting said shared superset cache directory and said main memory with bidirectional control and data busses;

providing no data bus or control bus between said shared subset cache directory and said shared data array or said main memory; and performing a step in response to removal of an entry from said shared cache memory of migrating said entry into said shared subset cache directory, so that said superset directory entry is not invalidated.

11. The method of claim 10 wherein said shared superset cache directory and said shared subset cache directory are substantially equal in size and collectively large enough to contain all processor cache directory entries.

12. The method of claim 11 wherein system cache data most recently accessed by said processor is hosted in said shared data array.

13. The method of claim 12 wherein a said directory known to be backed by system cached data will be evaluated for system cache data hits.

14. The method of claim 10 comprising:

writing an entry to said shared superset cache directory;

writing an address and a calling processor identifier for the entry to said L2 subset cache directory, LRUing said entry out of said superset cache directory; and retaining said address and said calling processor identifier for entry in said L2 subset cache directory.

15. The method of claim 10 wherein system cache data most recently accessed by said processors is hosted in said shared data array.

16. The method of claim 11 including evaluating said shared superset cache directory for system cache memory data hits.

17. The method of claim 10 comprising maintaining a record in said shared subset cache directory of which processors have cached which portions of memory actually being used thereby.

18. The method of claim 10 comprising writing an entry to said shared superset cache directory, and writing an address and a calling processor identifier for the entry to said shared subset cache directory, LRUing said entry out of said superset cache directory and retaining said address and said calling processor identifier for entry in said shared subset cache directory.

19. The method of claim 18 wherein system cache data most recently accessed by said processors is hosted in said shared data array.

* * * * *